US009999242B2

(12) United States Patent
Nunez et al.

(10) Patent No.: US 9,999,242 B2
(45) Date of Patent: Jun. 19, 2018

(54) PRODUCTION OF EXPANDED NUTS

(71) Applicant: Frito-Lay North America, Inc., Plano, TX (US)

(72) Inventors: Daniel Vera Nunez, Leicester (GB); Jung Han, Frisco, TX (US); Dimitrios Lykomitros, Amsterdam (NL); Joanna Campbell, Lincolnshire (GB); Ray McGarvey, Maspeth, NY (US); Cynthia M. Stewart, Carmel, NY (US)

(73) Assignee: Frito-Lay North America, Inc., Plano, TX (US)

( * ) Notice: Subject to any disclaimer, the term of this patent is extended or adjusted under 35 U.S.C. 154(b) by 114 days.

(21) Appl. No.: 15/107,029

(22) PCT Filed: Dec. 23, 2013

(86) PCT No.: PCT/US2013/077529
§ 371 (c)(1),
(2) Date: Jun. 21, 2016

(87) PCT Pub. No.: WO2015/099665
PCT Pub. Date: Jul. 2, 2015

(65) Prior Publication Data
US 2016/0331018 A1 Nov. 17, 2016

(51) Int. Cl.
*A23L 1/20* (2006.01)
*A23P 30/30* (2016.01)
(Continued)

(52) U.S. Cl.
CPC ............... *A23P 30/30* (2016.08); *A23L 11/00* (2016.08); *A23L 11/01* (2016.08); *A23L 25/00* (2016.08); *A23L 25/20* (2016.08); *A23V 2002/00* (2013.01)

(58) Field of Classification Search
CPC .......... A23P 30/30; A23L 11/01; A23L 11/00; A23L 25/00; A23L 25/252; A23V 2002/00
(Continued)

(56) References Cited

U.S. PATENT DOCUMENTS 2,761,781 A 9/1956 Bailey
3,294,549 A * 12/1966 Vox et al.
(Continued)

FOREIGN PATENT DOCUMENTS

WO 2013072387 A2 5/2013

OTHER PUBLICATIONS

PCT Search Report and Written Opinion for PCT/US2013/077529 dated Apr. 25, 2014 (12 pages).

*Primary Examiner* — Helen F Heggestad
(74) *Attorney, Agent, or Firm* — Colin P. Cahoon; Shaukat A. Karjeker; Carstens & Cahoon, LLP

(57) ABSTRACT

A method of producing expanded nuts, the method comprising the steps of: (a) immersing a plurality of nut kernels in an aqueous liquid thereby hydrating at least a portion of each kernel; and (b) gun puffing the hydrated kernels causing at least one of expansion and blistering of at least an outer surface of the nut kernels. There is also disclosed a method of method of producing expanded nuts, the method comprising the steps of: (a) immersing a plurality of nut kernels in an aqueous liquid at a pressure of at least 100 MPa thereby hydrating at least a portion of each kernel; and (b) dehydrating the hydrated kernels causing at least one of expansion and blistering of at least an outer surface of the nut kernels.

25 Claims, 1 Drawing Sheet

(51) Int. Cl.
  *A23L 11/00* (2016.01)
  *A23L 25/00* (2016.01)
(58) Field of Classification Search
  USPC .......................................... 426/632, 520, 506
  See application file for complete search history.

(56) References Cited

U.S. PATENT DOCUMENTS

| | | |
|---|---|---|
| 3,958,032 A | 5/1976 | Merriam |
| 5,138,937 A | 8/1992 | Zietlow |
| 2006/0083842 A1 | 4/2006 | Miller |
| 2008/0026118 A1 | 1/2008 | Bows et al. |
| 2012/0156352 A1 | 6/2012 | Moore et al. |

* cited by examiner

PRODUCTION OF EXPANDED NUTS

CROSS-REFERENCE TO RELATED APPLICATION

This application is a U.S. 371 National Stage Application from PCT/US2013/077529 filed Dec. 23, 2013, entitled "Production of Expanded Nuts," now WIPO Publication No. WO 2015/099665, published Jul. 2, 2015, the disclosure of which is incorporated herein by reference.

FIELD OF THE INVENTION

The present invention relates to a method of producing expanded nuts. In this specification the term "nut" also encompasses a legume.

BACKGROUND OF THE INVENTION

Currently peanuts are widely manufactured across the globe using known technologies (i.e. frying, roasting, etc.) to reduce their moisture from typically 5-10 wt % to 1-3 wt %, which then are flavored in order to have a ready to eat product. It is well known to produce snack foods from nuts and legumes. Typical known production processes for nuts, such as peanuts, cashew nuts and almonds, and legumes, such as beans and chickpeas, include blanching of the nuts/legumes, removal of any skin, coating of the nuts/legumes with a flavour coating, and then frying or oven roasting, and possibly final flavour addition. Accordingly, all added value to the nut/legume product is dependent upon the selection of the applied flavouring or coating, or the selection of the nut or legume grade.

Peanuts can be pre-treated before processing in order to enhance their attributes, such as: texture, appearance, flavor & color; some of these treatments are disclosed in WO-A-2013/072387 which discloses hydrating and marinating nuts and legumes to introduce flavour and texture into the nuts and legumes following the subsequent cooking step. The entire disclosures of WO-A-2013/072387 are incorporated herein by reference thereto.

Changes in appearance are mentioned in WO-A-2013/072387 such as surface blistering and changes in color. However there is still a need in the art to provide enhanced changes to nuts and legumes which are attractive to the consumer.

SUMMARY OF THE INVENTION

In one aspect, the present invention aims to provide a process that can add value to the nuts/legumes themselves, in particular peanuts, by modifying the properties of the meat and surface of the nut/legume during the production process. The present invention aims to provide a nut/legume product which modifies the texture or other properties of the nut/legume kernel over and above conventional coating technologies which can provide a product with a unique texture, and optionally appearance, and further optionally flavour, to the consumer as compared to conventional nut/legume products.

The present invention provides a method of producing expanded nuts, the method comprising the steps of:
(a) immersing a plurality of nut kernels in an aqueous liquid thereby hydrating at least a portion of each kernel; and
(b) gun puffing the hydrated kernels causing at least one of expansion and blistering of at least an outer surface of the nut kernels.

The present invention also provides method of producing expanded nuts, the method comprising the steps of:
(a) immersing a plurality of nut kernels in an aqueous liquid at a pressure of at least 100 MPa thereby hydrating at least a portion of each kernel; and
(b) dehydrating the hydrated kernels causing at least one of expansion and blistering of at least an outer surface of the nut kernels.

The present invention further provides an expanded and texturized nut produced by any of the methods of the present invention.

The present invention further provides an expanded and texturized nut having a bulk density of from 30 to 50% lower than the nut when raw.

The present invention further provides an expanded and texturized nut having a bulk density of less than 630 Kg/m$^3$, typically from 450 to 600 Kg/m$^3$.

The present invention further provides an expanded and texturized nut having a void content of from 25 to 50 volume % based upon the volume of the expanded and texturized nut.

The expansion may cause the outer surface of the nut kernel to fracture and the nut to open up to expose an interior of the nut kernel. Alternatively, the expansion may cause the nut kernel to expand in volume while retaining the shape of the nut kernel.

For all of these aspects of the invention, further preferred features are defined in the dependent claims.

BRIEF DESCRIPTION OF THE DRAWINGS

Embodiments of the present invention will now be described by way of example with reference to the accompanying drawings, in which.

DETAILED DESCRIPTION OF THE PREFERRED EMBODIMENTS

First Embodiment—Hydration then Gun Puffing

Figure 1:
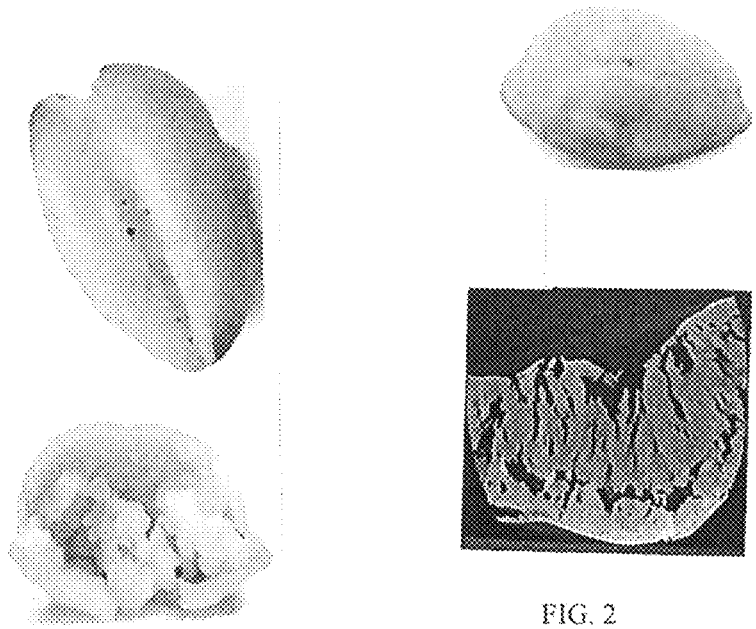
FIG. 1 shows a perspective view and a cross-section though a first gun puffed peanut produced in accordance with an embodiment of the present invention.

In one embodiment of the present invention, there is provided a method of producing expanded nuts, the method comprising the steps of:
(a) immersing a plurality of nut kernels in an aqueous liquid thereby hydrating at least a portion of each kernel; and
(b) gun puffing the hydrated kernels causing at least one of expansion and blistering of at least an outer surface of the nut kernels.

The nut may be selected from any one of a peanut, an almond a cashew nut, a brazil nut, or any mixture of two or more of these nuts, or a legume, or a mixture of at least one legume with at least one nut. Typically, the nut kernels treated in the immersing step (a) may comprise raw nuts or blanched nuts, optionally in each case with any skin either present, removed or partially removed. Alternatively, the nut kernels treated in the immersing step (a) may comprise pressed and de-oiled nuts, optionally peanuts or cashew nuts.

In the immersing step (a), typically the aqueous liquid is water or comprises an aqueous solution or dispersion of a humectant for controlling hydration of the kernel. Optionally, the humectant being selected from an edible ionic salt compound, for example sodium chloride, and/or a compound enhancing the osmotic pressure of the aqueous liquid on the kernel, for example a sugar, such as glucose. In the immersing step (a), the aqueous liquid typically comprises from 2 to 20 wt % starch, from 0.5 to 5 wt % sodium chloride, from 1 to 20 wt % sugar and from 0.1 to 1 wt % calcium hydroxide. Preferably, the immersing step (a) simultaneously hydrates and marinates at least one flavoring and/or colorant additive into at least a part of an outer layer of the nut kernel.

In some embodiments, the immersing step (a) is carried out in at least one immersion phase for a time period of from 1 to 24 hours and at a temperature of from 4 to 30° C. The immersing step (a) may optionally further comprise a high temperature immersion phase which is carried out for a time period of from 1 to 6 hours and at a temperature of from 70 to 98° C. Typically, the immersing step (a) is carried out for a time period of from 30 to 300 minutes and at a temperature of from 50 to 100° C. at atmospheric pressure, for example for a time period of from 30 to 240 minutes and at a temperature of from 90 to 95° C. at atmospheric pressure. In another embodiment, the immersing step (a) is carried out at a pressure of at least 100 MPa, optionally from 250 to 750 MPa, further optionally from 400 to 600 MPa. The immersing step (a) may be carried out for a time period of from 1 to 20 minutes, such as from 2 to 8 minutes. The immersing step (a) may be carried out at a temperature of from 5 to 90° C., for example from 10 to 80° C.

In some embodiments, between the immersing step (a) and the gun puffing step (b) the hydrated kernels are pre-roasted, for example at a temperature of at least 100° C., so as to be at least partially cooked, optionally the roasting forming a hardened outer surface on the hydrated kernel to enhance expansion during the gun puffing step (b).

For example, the pre-roasting is carried out for a period of from 1 to 20 minutes at a temperature of from 50 to 200° C. In some preferred embodiments the pre-roasting is carried out for a period of from 2 to 15 minutes at a temperature of from 80 to 200° C. In some preferred embodiments the pre-roasting is carried out for a period of from 2 to 5 minutes at a temperature of from 80 to 165° C.

Optionally, prior to gun puffing step (b) at least some of the nut kernels are coated with a coating layer, for example a starch or cellulose layer, which reduces the transmission of steam from the nut surface during the gun puffing step (b) and enhances popping of the nut kernel during the gun puffing step (b).

The gun puffing step (b) is preferably carried out at a gun puffing pressure of at least 150 kPa. In some preferred embodiments, the gun puffing step (b) is carried out at a gun puffing pressure of from 250 to 1000 kPa, typically from 450 to 900 kPa. In the gun puffing step (b), the hydrated kernels are puffed by reducing the pressure from a gun puffing pressure to atmospheric pressure in a period of less than 1 second. This rapid reduction in pressure decreases the surface temperature of the nut kernels as a result of rapid evaporation of moisture within the nut kernel, and the evaporation causes rapid expansion of the nut kernels.

Typically, the puffer temperature and internal chamber pressure of the gun puffing apparatus are controlled to achieve the desired moisture content and texture of the expanded nut kernels. Typically, the temperature is at least 100° C. and the internal chamber pressure is greater than 1 atmosphere.

For example, the gun puffing pressure is at a value of from greater than 1 atmosphere to up to 9 atmospheres, with a chamber temperature of from greater than 50 to up to 200° C. In some preferred embodiments the gun puffing pressure is at a value of from 5 to 9 atmospheres, with a chamber temperature of from greater than 80 to up to 200° C. In some preferred embodiments the gun puffing pressure is at a value of from 2 to 4 atmospheres, with a chamber temperature of from greater than 80 to up to 165° C.

Preferably, the hydrated kernels treated in the gun puffing step (b) have an initial moisture content of from 10 to 35 wt %, more preferably from 20 to 30 wt %, based on the total weight of the hydrated kernel. After step (b) the gun puffed nut kernels typically have a moisture content of from 0.1 to 5 wt % based on the total weight of the gun puffed nut kernel. The gun puffed nut kernels may be treated to a subsequent dehydration step, which may include coking the nuts, to reduce the moisture content to the final desired level, for example about 2 wt %. The dehydrated nut kernels may be topically seasoned prior to packaging.

The immersing step (a) and gun puffing step (b) are typically carried out to produce an expanded and texturized nut product by forming blisters on an outer surface of the nut kernels and voids in a body of the nut kernels, the gun puffing step causing free water within the kernel from the immersing step to evaporate thereby expanding the body and blistering the outer surface of the kernel. Typically, the expanded and texturized nut has a bulk density of from 30 to 50% lower than the nuts prior to step (a). Typically, the expanded and texturized nuts have a bulk density of less than 630 Kg/m$^3$, typically from 450 to 600 Kg/m$^3$. Typically, the expanded and texturized nuts have a void content of from 25 to 50 volume % based upon the volume of the expanded and texturized nuts.

Second Embodiment—High Pressure Hydration then Dehydration

In a further embodiment of the present invention, there is provided a method of producing expanded nuts, the method comprising the steps of:

(a) immersing a plurality of nut kernels in an aqueous liquid at a pressure of at least 100 MPa thereby hydrating at least a portion of each kernel; and (b) dehydrating the hydrated kernels causing at least one of expansion and blistering of at least an outer surface of the nut kernels.

Typically, the nut is selected from any one of a peanut, an almond a cashew nut, a brazil nut, or any mixture of two or more of these nuts. The nut kernels treated in the immersing step (a) may comprise raw nuts or blanched nuts, optionally in each case with any skin either present, removed or partially removed. Alternatively, the nut kernels treated in the immersing step (a) comprise pressed and de-oiled nuts, optionally peanuts or cashew nuts.

Typically, the immersing step (a) is carried out at a pressure of from 250 to 750 MPa, optionally from 400 to 600 MPa. Typically, the immersing step (a) is carried out for a time period of from 1 to 20 minutes, for example from 2 to 8 minutes. Typically, the immersing step (a) is carried out at a temperature of from 4 to 90° C., for example from 10 to 80° C.

Typically, in the immersing step (a) the aqueous liquid is water or comprises an aqueous solution or dispersion of a humectant for controlling hydration of the kernel, optionally the humectant being selected from an edible ionic salt compound, for example sodium chloride, and/or a compound enhancing the osmotic pressure of the aqueous liquid on the kernel, for example a sugar, such as glucose. Optionally, in the immersing step (a) the aqueous liquid comprising from 2 to 20 wt % starch, from 0.5 to 5 wt % sodium chloride, from 1 to 20 wt % sugar and from 0.1 to 1 wt % calcium hydroxide. Preferably, the immersing step (a) simultaneously hydrates and marinates at least one flavoring and/or colorant additive into at least a part of an outer layer of the nut kernel.

Typically, the hydrated kernels treated in the dehydrating step (b) have an initial moisture content of from 10 to 35 wt %, for example from 20 to 30 wt %, based on the total weight of the hydrated kernel.

Optionally, prior to step (b) at least some of the nut kernels are coated with a coating layer which reduces the transmission of steam from the nut surface during the dehydrating step (b) and enhances popping of the nut kernel during the dehydrating step (b).

Typically, the dehydrating step (b) is carried out by roasting the nut kernels at a temperature of at least 100° C., baking the nut kernels at a temperature of at least 100° C., by toasting the nut kernels at a temperature of at least 100° C., frying the nut kernels at a temperature of at least 100° C., and/or by drying the nut kernels in air at a temperature of at least 40° C.

In some embodiments, after step (b) the dehydrated nut kernels have a moisture content of from 0.5 to 5 wt % based on the total weight of the dehydrated nut kernel.

Preferably, the immersing step (a) and dehydrating step (b) are carried out to produce an expanded and texturized nut product by forming blisters on an outer surface of the nut kernels and voids in a body of the nut kernels, the dehydrating step causing free water within the kernel from the immersing step to evaporate thereby expanding the body and blistering the outer surface of the kernel.

The dehydrates nut kernels may be treated to a subsequent finish drying step, which may include coking the nuts, to reduce the moisture content to the final desired level, for example about 2 wt %. The dehydrated nut kernels may be topically seasoned prior to packaging.

The present invention is described in further detail with reference to the following non-limiting Examples.

Example 1

In this Example, peanuts were provided. The peanuts may be of any variety, for example from Argentina, Brazil, Virginia USA, Nicaragua, etc. The peanuts may be raw or blanched peanuts, or they may be defatted peanuts which have been defatted in a pressing operation to press peanut oil out of the nut kernels, as is known in the art per se.

The peanuts were subjected to an infusion/hydration step at ambient pressure (1 atmosphere). The peanuts were infused with water or an aqueous solution comprising flavorants and/or colorants by immersion in a bath for a sufficient period of time to achieve hydration in the peanut structure. The peanut outer surface is also hydrated and following the subsequent treatment as described herein the outer surface is expanded.

The infusion/hydration step was carried out in a first phase at an ambient temperature (20° C.) for a period of 16 hrs and then in a subsequent second higher temperature phase at a temperature of 94° C. for a period of 4 hrs.

The infusion solution comprised water, starch (2-20 wt %), NaCl (0.5-5 wt %), sugar (1-20 wt %), $Ca(OH)_2$ (0.1-1 wt %), colorant and flavorant. These components were in aqueous solution. The wt % amounts are based on the weight of the infusion solution.

The nuts were then subjected to a gun puffing step as described for Example 3 to produce expanded and texturized nuts.

Example 2

In this Example, peanuts were also provided, as described above for Example 1.

The peanuts were subjected to an ambient pressure infusion/hydration step. The peanuts were infused with water or an aqueous solution, as described above for Example 1, under high temperature condition for a sufficient period of time to achieve hydration in the peanut structure. The peanut outer surface is hydrated. Following the subsequent treatment as described herein the outer surface is expanded.

The infusion/hydration step was carried out at a temperature of at least 100° C., by boiling the peanuts in the aqueous solution, typically for a period of at least 10 minutes up to 1 hour.

The infusion/hydration step hydrates the peanut and increases the moisture content from about 5 wt % to up to about 28 wt %. The increased moisture is employed in a subsequent gun puffing step to promote expansion of the peanut, and provide a unique texture in the final nut product.

The nuts were then subjected to a gun puffing step as described for Example 3 to produce expanded and texturized nuts.

Example 3

The hydrated nut kernels of Examples 1 and 2 were optionally subjected to a subsequent cooking or dehydration step to achieve a desired moisture content of from 10 to 35 wt %, typically from 20 to 30 wt %. The cooking or dehydration step employed roasting, frying, baking, toasting, or air drying (for example at a temperature of at least 40° C., microwave treatment or vacuum expansion, to achieve the desired moisture content. The time period is typically from 1 to 10 minutes, for example roasting for two minutes.

The resultant nut kernels with the desired moisture content were then subjected to a gun puffing step which dehydrated the nut kernels. In the gun puffing step the pressure was typically from 5 atmospheres to 9 atmospheres. A gun puffing pressure was estimated to produce a nut kernel surface temperature of about 153° C. for a pressure of 5 atmospheres, about 165° C. for a pressure of 7 atmospheres and about 175° C. for a pressure of 9 atmospheres.

The gun puffing technology allows a significant expansion, modifying the peanut into an open expanded and blistered product.

FIG. 1 shows a perspective view and a cross-section through a first gun puffed peanut produced in accordance with Example 4. The internal voids in the peanut can be seen.

Figure 2:
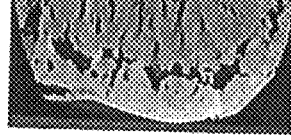
FIG. 2 shows a perspective view and a cross-section though a second gun puffed peanut produced in accordance another embodiment of the present invention.

FIG. 2 shows a perspective view and a cross-section through a second gun puffed peanut produced in accordance with Example 4. The internal voids in the peanut can be seen.

Figure 3:
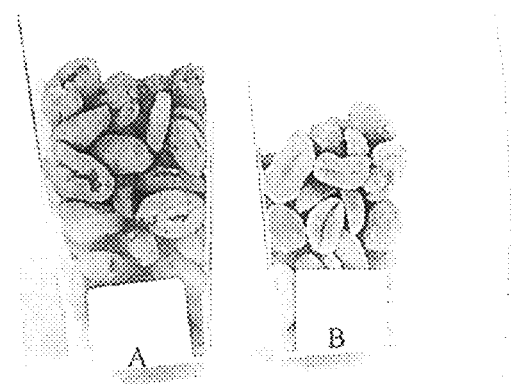
FIG. 3 shows a perspective view of two samples peanuts in a container, one sample produced according to another embodiment of the present invention, and the other sample being the original peanuts prior to be treated according to the embodiment of the present invention.

FIG. 3 shows a perspective view of two samples of a 30 gram portion of peanuts in a container, the left-hand sample being gun puffed according to Example 4 and the right-hand sample being the original peanuts. The increase in bulk density, typically a 30 to 40% increase, achieved by gun puffing in accordance with preferred embodiments of the present invention can clearly be seen.

In the gun puffing step the substantially instantaneous (less than one second) release of the elevated pressure of over 150 KPa causes rapid expansion of the meat of the nut kernel as a result of evaporation of internal moisture. This expands the nut meat, forming voids and surface blistering. The result is a nut kernel having a lower desired moisture content and a desired texture, with surface blistering and internal voids. The bulk density of the nut kernel is lowered.

After the gun puffing steps, the nuts may be subjected to post treatments such as roasting, frying, baking, toasting, air drying, etc. until the desirable moisture content is achieved.

Example 4

In this Example, peanuts were also provided, as described above for Example 1.

The peanuts were subjected to a high pressure infusion/hydration step. The peanuts were infused with water or an aqueous solution, as described above for Example 1, under pressurized condition for a sufficient period of time to achieve hydration in the peanut structure, including the inner layers of the peanut kernel. The peanut outer surface is also hydrated. Following the subsequent treatment as described herein the inner layers and outer surface are expanded.

The infusion/hydration step was carried out at an ambient temperature (20° C.) or up to about 80° C. either at a pressure of 400 MPa for a period of up to 10 minutes, for example 5 minutes, or at a pressure of 600 MPa for a period of up to 10 minutes, for example 7 minutes.

The resultant hydrated nut kernels had an initial moisture content of from 10 to 35 wt %, for example from 20 to 30 wt %, based on the total weight of the hydrated kernel.

The resultant hydrated nut kernels were then subjected to a dehydrating step which was carried out by roasting the nut kernels at a temperature of at least 100° C., baking the nut kernels at a temperature of at least 100° C., by toasting the nut kernels at a temperature of at least 100° C., frying the nut kernels at a temperature of at least 100° C., or by drying the nut kernels in air at a temperature of at least 40° C. This caused the nut kernels to be expanded and texturized.

After the dehydrating steps, the nuts may be subjected to post treatments such as roasting, frying, baking, toasting, air drying, etc. until the desirable moisture content is achieved. The resultant expanded and texturized nut kernels were dehydrated so as to have a moisture content of from 0.5 to 5 wt % based on the total weight of the dehydrated nut kernel.

The present invention provides expanded nuts, which may be legumes with a number of advantageous properties. The expanded nuts, for example peanuts may provide the same volume as regular nuts/peanuts with 30-40% less mass. The expanded nuts may provide a bigger size impression to the consumer with same weight as regular nuts/peanuts. The method imparts a roasted color to the expanded nuts, which also have an open, expanded and blistered appearance. The expanded nuts may have a light and airy texture, and may also be crispy.

When consumed, the expanded nuts may provide a less fatty mouth feel, yet with a recognizable nut, e.g. peanut, taste.

Further modifications to the inventions and the various embodiments disclosed herein will be readily apparent to those skilled in the art and are encompassed within the present invention as defined in the appended claims.

What is claimed is:

1. A method of producing expanded nuts, the method comprising the steps of:
  (a) immersing a plurality of raw or blanched nut kernels in an aqueous liquid thereby hydrating at least a portion of the plurality of nut kernels, the aqueous liquid is water or comprises an aqueous solution or dispersion of a humectant for controlling hydration of the nut kernels;
  (b) roasting the hydrated kernels at a temperature of at least 100° C. to be at least partially cooked, and thereby forming hardened outer surfaces on the hydrated kernels;
  (c) coating at least some of the nut kernels with a starch or cellulose layer to reduce transmission of steam through nut surfaces;
  (d) gun puffing the hydrated kernels causing at least one of: expansion of the hydrated nut kernels, or blistering of at least an outer surface of the hydrated nut kernels; and
  (e) producing by steps (a) to (d) an expanded and texturized nut product with a bulk density of from 30 to 50% lower than the raw or blanched nuts prior to step (a), and/or the expanded and texturized nut product has a bulk density from 450 to 600 Kg/m$^3$.

2. The method of claim 1, wherein the gun puffing step (d) is carried out at a gun puffing pressure of at least 150 kPa, optionally with a chamber temperature in a gun puffing apparatus of from greater than 50° C. to up to 200° C.

3. The method of claim 1, wherein the gun puffing step (d) is carried out at a gun puffing pressure of from 250 to 1000 kPa.

4. The method of claim 1, wherein in the gun puffing step (d) the hydrated kernels are puffed by reducing the pressure from a gun puffing pressure to atmospheric pressure in a period of less than 1 second.

5. The method of claim 1, wherein the hydrated kernels treated in the gun puffing step (d) have an initial moisture content of from 10 to 35 wt % based on the total weight of the hydrated kernel.

6. The method of claim 1, wherein the immersing step (a) simultaneously hydrates and marinates at least one flavoring and/or colorant additive into at least a part of an outer layer of the nut kernel.

7. The method of claim 1, wherein the immersing step (a) is carried out in at least one immersion phase for a time period of from 1 to 24 hours and at a temperature of from 4 to 30° C., or is carried out for a time period of from 1 to 6 hours and at a temperature of from 70 to 98° C.

8. The method of claim 1, wherein the immersing step (a) is carried out for a time period of from 30 to 300 minutes and at a temperature of from 50 to 100° C. at atmospheric pressure, or is carried out for a time period of from 30 to 240 minutes at a temperature of from 90 to 95° C. at atmospheric pressure.

9. The method of claim 1, wherein the immersing step (a) is carried out at a pressure of from 250 to 750 MPa.

10. The method of claim 9, wherein the immersing step (a) is carried out for a time period of from 1 to 20 minutes.

11. The method of claim 9, wherein the immersing step (a) is carried out at a temperature of from 5 to 90° C.

12. The method of claim 1, wherein the raw or blanched nut kernels have any skin either present, removed or partially removed.

13. The method of claim 1, wherein after step (d) the gun puffed nut kernels have a moisture content of from 0.1 to 5 wt % based on the total weight of the gun puffed nut kernel.

14. The method of claim 1, wherein the nut is selected from any one of a legume, an almond, a cashew nut, a brazil nut, or any mixture of two or more of these nuts.

15. A method of producing expanded nuts, the method comprising the steps of:
   (a) immersing a plurality of raw or blanched nut kernels in an aqueous liquid at a pressure of at least 100 MPa thereby hydrating at least a portion of each kernel;
   (b) coating the nuts with a layer of starch or cellulose to reduce transmission of steam from the nut and enhance popping of the nut kernel;
   (c) dehydrating the hydrated kernels causing at least one of expansion, and blistering of at least an outer surface of the nut kernels; and thereby producing an expanded and texturized nut product by forming blisters on an outer surface of the nut kernels and voids in a body of the nut kernels, wherein the expanded and texturized nuts have a bulk density of from 30 to 50% lower than the raw or blanched nuts prior to step (a), and/or (ii) the expanded and texturized nuts have a bulk density from 450 to 600 Kg/m$^3$.

16. The method of claim 15, wherein the immersing step (a) is carried out at a pressure of from 250 to 750 MPa.

17. The method of claim 15, wherein the immersing step (a) is carried out for a time period of from 1 to 20 minutes.

18. The method of claim 15, wherein the immersing step (a) is carried out at a temperature of from 4 to 90° C.

19. The method of claim 15, wherein the dehydrating step (c) is carried out by (i) roasting the nut kernels at a temperature of at least 100° C., or (ii) baking the nut kernels at a temperature of at least 100° C., or (iii) toasting the nut kernels at a temperature of at least 100° C., or (iv) frying the nut kernels at a temperature of at least 100° C. or (v) drying the nut kernels in air at a temperature of at least 40° C.

20. The method of claim 15, wherein the hydrated kernels treated in the dehydrating step (c) have an initial moisture content of from 10 to 35 wt % based on the total weight of the hydrated kernel.

21. The method of claim 15, wherein in the immersing step (a) the aqueous liquid is water, or aqueous dispersion of a humectant for controlling hydration of the kernel, the humectant including a compound enhancing the osmotic pressure of the aqueous liquid on the kernel.

22. The method of claim 15, wherein the immersing step (a) simultaneously hydrates and marinates at least one flavoring and/or colorant additive into at least a part of an outer layer of the nut kernel.

23. The method of claim 15, wherein the nut kernels treated in the immersing step (a) comprise raw nuts or blanched nuts, optionally in each case with any skin either present, removed or partially removed.

24. The method of claim 15, wherein after step (b) the dehydrated nut kernels have a moisture content of from 0.5 to 5 wt % based on the total weight of the dehydrated nut kernel.

25. The method of claim 15, wherein the plurality of nuts comprises peanuts, almonds, cashew nuts, brazil nuts, or any mixture of two or more of these nuts.

\* \* \* \* \*